(12) United States Patent
Hou et al.

(10) Patent No.: US 7,472,479 B2
(45) Date of Patent: Jan. 6, 2009

(54) HEAT PIPE AND METHOD OF PRODUCING THE SAME

(75) Inventors: Chuen-Shu Hou, Guangdong (CN); Chao-Nien Tung, Guangdong (CN); Tay-Jian Liu, Guangdong (CN); Chih-Hao Yang, Guangdong (CN); Kuo-Chu Hsieh, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 346 days.

(21) Appl. No.: 11/307,155

(22) Filed: Jan. 26, 2006

(65) Prior Publication Data

US 2007/0034357 A1 Feb. 15, 2007

(30) Foreign Application Priority Data

Aug. 12, 2005 (CN) .................. 2005 1 0036589

(51) Int. Cl.
*B21D 53/06* (2006.01)
*B23P 6/00* (2006.01)
*B23P 19/04* (2006.01)
*F28D 15/00* (2006.01)

(52) U.S. Cl. ............. 29/890.032; 29/726; 29/890.045; 165/104.26

(58) Field of Classification Search ............ 29/726, 29/890.032, 890.045; 165/104.26
See application file for complete search history.

(56) References Cited

U.S. PATENT DOCUMENTS

| 3,857,441 | A | | 12/1974 | Arcella | |
|---|---|---|---|---|---|
| 3,964,902 | A | * | 6/1976 | Fletcher et al. | 29/890.032 |
| 4,196,504 | A | * | 4/1980 | Eastman | 29/890.032 |
| 4,274,479 | A | * | 6/1981 | Eastman | 29/890.032 |
| 5,076,352 | A | * | 12/1991 | Rosenfeld et al. | 165/104.26 |
| 7,303,001 | B2 | * | 12/2007 | Leu et al. | 165/104.26 |
| 2006/0179653 | A1 | * | 8/2006 | Sun et al. | 29/890.032 |
| 2006/0207750 | A1 | * | 9/2006 | Chang et al. | 165/104.26 |
| 2006/0213061 | A1 | * | 9/2006 | Wu et al. | 29/890.032 |
| 2007/0044308 | A1 | * | 3/2007 | Chen | 29/890.032 |

FOREIGN PATENT DOCUMENTS

| CN | 2665800 Y | 12/2004 |
|---|---|---|
| CN | 200320121761.X | 12/2004 |
| CN | 2679628 Y | 2/2005 |
| CN | 200420005907.9 | 2/2005 |
| JP | 11-294980 | 10/1999 |

* cited by examiner

*Primary Examiner*—David P Bryant
*Assistant Examiner*—Alexander P Taousakis
(74) *Attorney, Agent, or Firm*—Winston Hsu

(57) ABSTRACT

A heat pipe (50) and a method (100) of producing the heat pipe are disclosed. The method includes the following steps: (1) inserting a mandrel (10) into a hollow metal casing (20) with a porous structure (30) combined to an outer surface of the mandrel; (2) filling powders (40) into a space formed between the hollow metal casing and the porous structure; (3) sintering the filled powders; (4) drawing the mandrel out of the hollow metal casing; and (5) sealing the hollow metal casing with a working fluid filled therein. The heat pipe produced by this method includes a composite wick structure (60) arranged in the hollow metal casing. By using this method, the mandrel can be easily drawn out of the hollow metal casing after the filled powders are sintered.

11 Claims, 7 Drawing Sheets

HEAT PIPE AND METHOD OF PRODUCING THE SAME

FIELD OF THE INVENTION

The present invention relates generally to an apparatus for transfer or dissipation of heat from heat-generating components, and more particularly to a heat pipe and a method of producing the heat pipe.

DESCRIPTION OF RELATED ART

Heat pipes have excellent heat transfer performance due to their low thermal resistance, and therefore are an effective means for transfer or dissipation of heat from heat sources. Currently, heat pipes are widely used for removing heat from heat-generating components such as central processing units (CPUs) of computers. A heat pipe is usually a vacuum casing containing therein a working fluid. Preferably, a wick structure is provided inside the heat pipe, lining an inner wall of the casing. The heat pipe has an evaporating section for receiving heat from a heat-generating component and a condensing section for releasing the heat absorbed by the evaporating section. When heat generated by a heat-generating component is inputted into the heat pipe via its evaporating section, the working fluid contained therein absorbs the heat and turns into vapor. Due to the difference of vapor pressure between the two sections of the heat pipe, the generated vapor moves, with the heat being carried, towards the condensing section where the vapor is condensed into condensate after releasing the heat into ambient environment by, for example, fins thermally contacting the condensing section. Due to the difference of capillary pressure developed by the wick structure between the two sections, the condensate is then drawn back by the wick structure to the evaporating section where it is again available for evaporation.

The wick structure currently available for the heat pipe includes fine grooves integrally formed in the inner wall of the casing, mesh or bundles of fiber inserted into the casing and held against the inner wall thereof, or sintered powders combined to the inner wall of the casing. As with the sintered powder wick, it commonly is made by using a sintering process. FIG. 7 illustrates a conventional sintering process used to make a sintered powder wick, in which a mandrel 81 is inserted into a hollow casing 82 of a heat pipe and powders 83 necessary to form the sintered powder wick are filled into a space defined between the mandrel 81 and the casing 82. Then, the filled powders 83 together with the casing 82 are heated at a high temperature, whereby the filled powders 83 are diffusion bonded together and sintered to form the sintered powder wick.

In the above-mentioned sintering process, the filled powders 83 will also have a diffusion bond with the mandrel 81 at their contacting interface, i.e., an outer surface of the mandrel 81 and an inner peripheral layer of the filled powders 83 contacting the mandrel 81. Furthermore, if the filled powders 83 used to form the sintered powder wick are copper powders, they will expand by 2 to 3 percents in volume in the temperature range of about 600 to 800 degrees centigrade during the sintering process. Thus, after the sintering process, it becomes difficult to draw the mandrel 81 out of the casing 82. If the mandrel 81 is forcibly drawn out, the casing 82 of the heat pipe will possibly be deformed due to such drawing action. In some cases, the heat pipe becomes useless since the mandrel 81 cannot be removed from the casing 82 or the casing 82 is severely deformed after the mandrel 81 is drawn out.

In order to separate the mandrel 81 from the casing 82 more easily, prior to being inserted into the casing 82, the mandrel 81 typically is nitrogenized and applied with a layer of heat-resistant material such as tungsten powders, boron nitride (BN) or ceramic powders on an outer surface thereof so as to reduce an extent of diffusion bond between the mandrel 81 and the filled powders 83. However, when the mandrel 81 is being removed out of the casing 82 after the sintering process, the heat-resistant material applied to the outer surface of the mandrel 81 is possibly scraped from the mandrel 81 and left within the casing 82 due to a friction between the mandrel 81 and the filled powders 83, in which case the heat-resistant material will block pores in the sintered powder wick to affect the flow of the condensate from the condensing section to the evaporating section.

Therefore, it is desirable to provide a method of producing a heat pipe which overcomes the foregoing disadvantages.

SUMMARY OF INVENTION

The present invention relates, in one aspect, to a method of producing a heat pipe. The method includes the following steps: (1) inserting a mandrel into a hollow metal casing with a porous structure combined to an outer surface of the mandrel; (2) filling powders into a space formed between the hollow metal casing and the porous structure; (3) sintering the filled powders; (4) drawing the mandrel out of the hollow metal casing; and (5) sealing the hollow metal casing with a working fluid filled therein.

The present invention relates, in another aspect, to a heat pipe. The heat pipe includes a hollow metal casing and a wick structure arranged in the hollow metal casing. The wick structure includes a powder layer and a mesh layer stacked on the powder layer. The powder layer and the mesh layer are combined together by heating. The powder layer is sandwiched between the mesh layer and the metal casing.

Other advantages and novel features of the present invention will become more apparent from the following detailed description of preferred embodiment when taken in conjunction with the accompanying drawings, in which:

DETAILED DESCRIPTION

Figure 1:
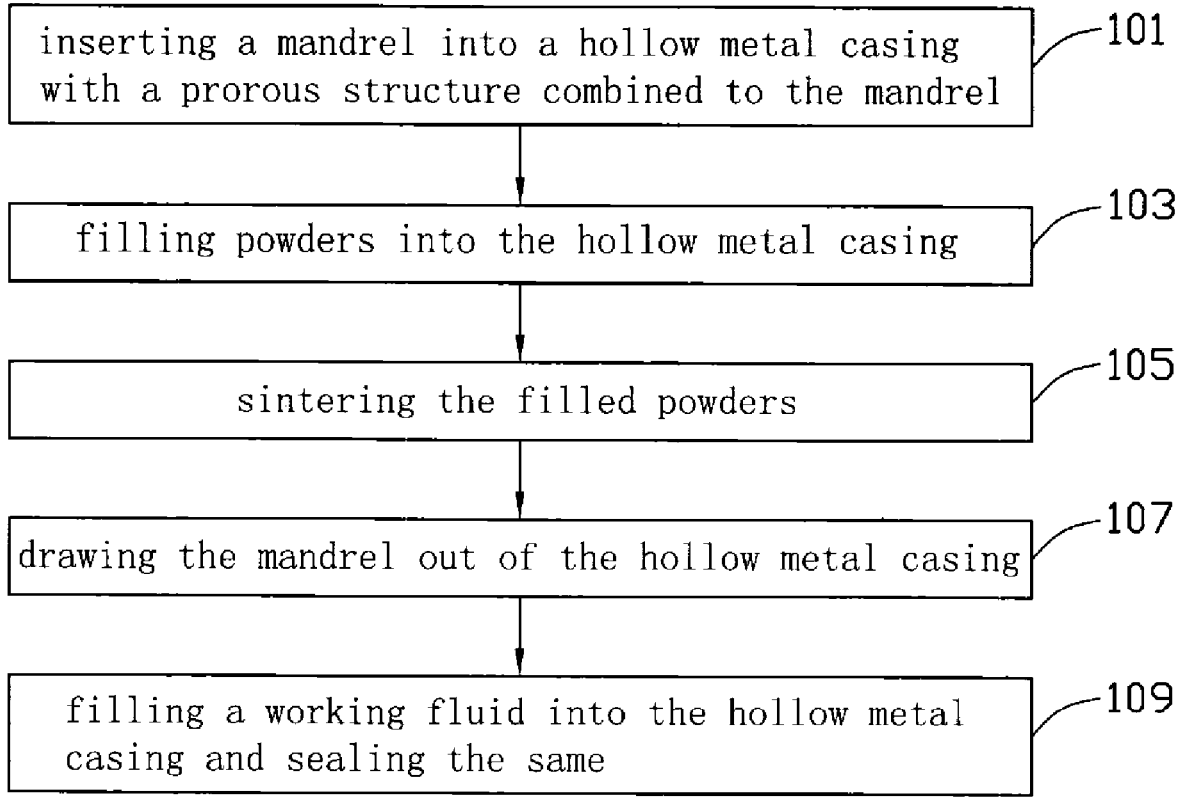
FIG. 1 is a flow chart showing a preferred method of the present invention used to produce a heat pipe.
Figure 2:
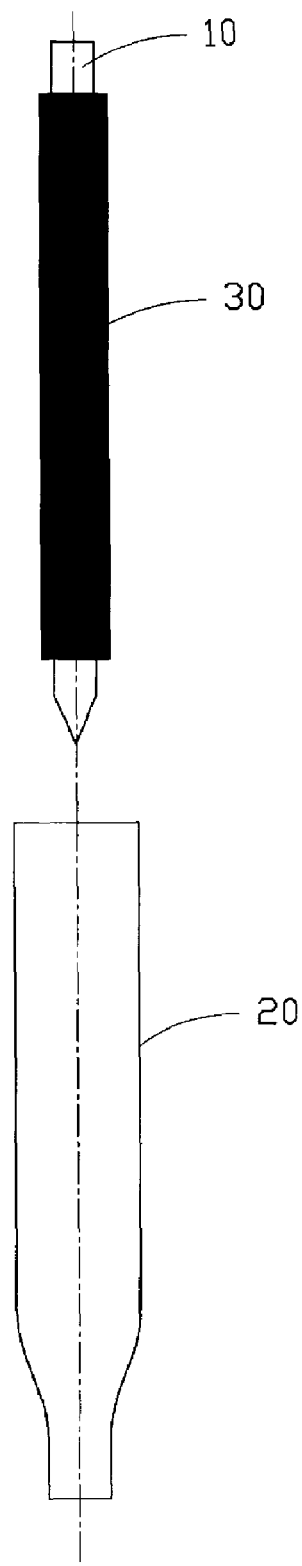
FIG. 2 is a view illustrating the first step of the method of FIG. 1 in producing the heat pipe.

FIG. 1 is a flow chart showing a preferred method 100 of the present invention adopted for manufacturing a heat pipe. With reference also to FIGS. 2-6, an example is shown to produce the heat pipe by using the method 100. With respect to the step 101, a mandrel 10 is inserted into a hollow metal casing 20 with a mesh 30 combined to an outer surface of the mandrel 10, as illustrated in FIG. 2. Preferably, the mesh 30 is previously combined to the mandrel 10 before the mandrel 10 is inserted into the hollow metal casing 20. The hollow metal casing 20 is made of high thermally conductive material such as copper or aluminum. The mesh 30 is a porous structure made by weaving together a plurality of flexible wires such as metal wires or synthetic fibers. Alternatively, the mesh 30 may also be substituted by some other porous structures such as a thin metal sheet with a plurality of holes defined therein.

Figure 3:
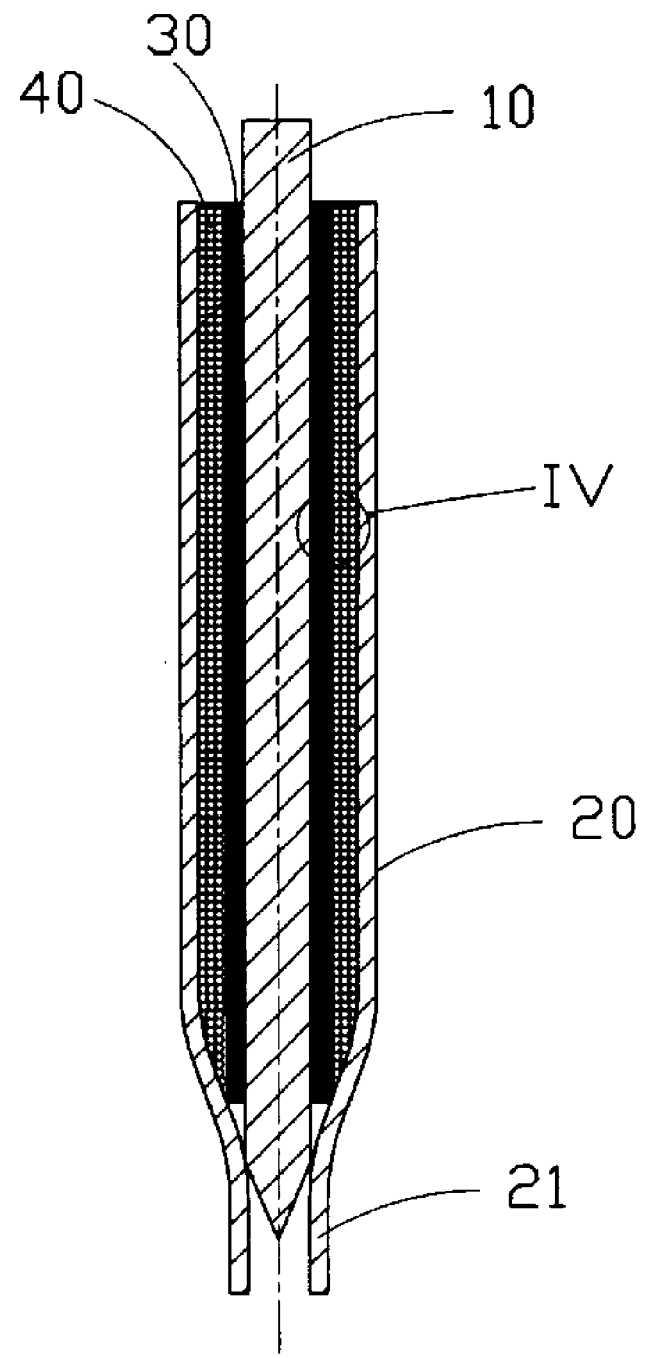
FIG. 3 is a view illustrating the second step of the method of FIG. 1 in producing the heat pipe.
Figure 4:
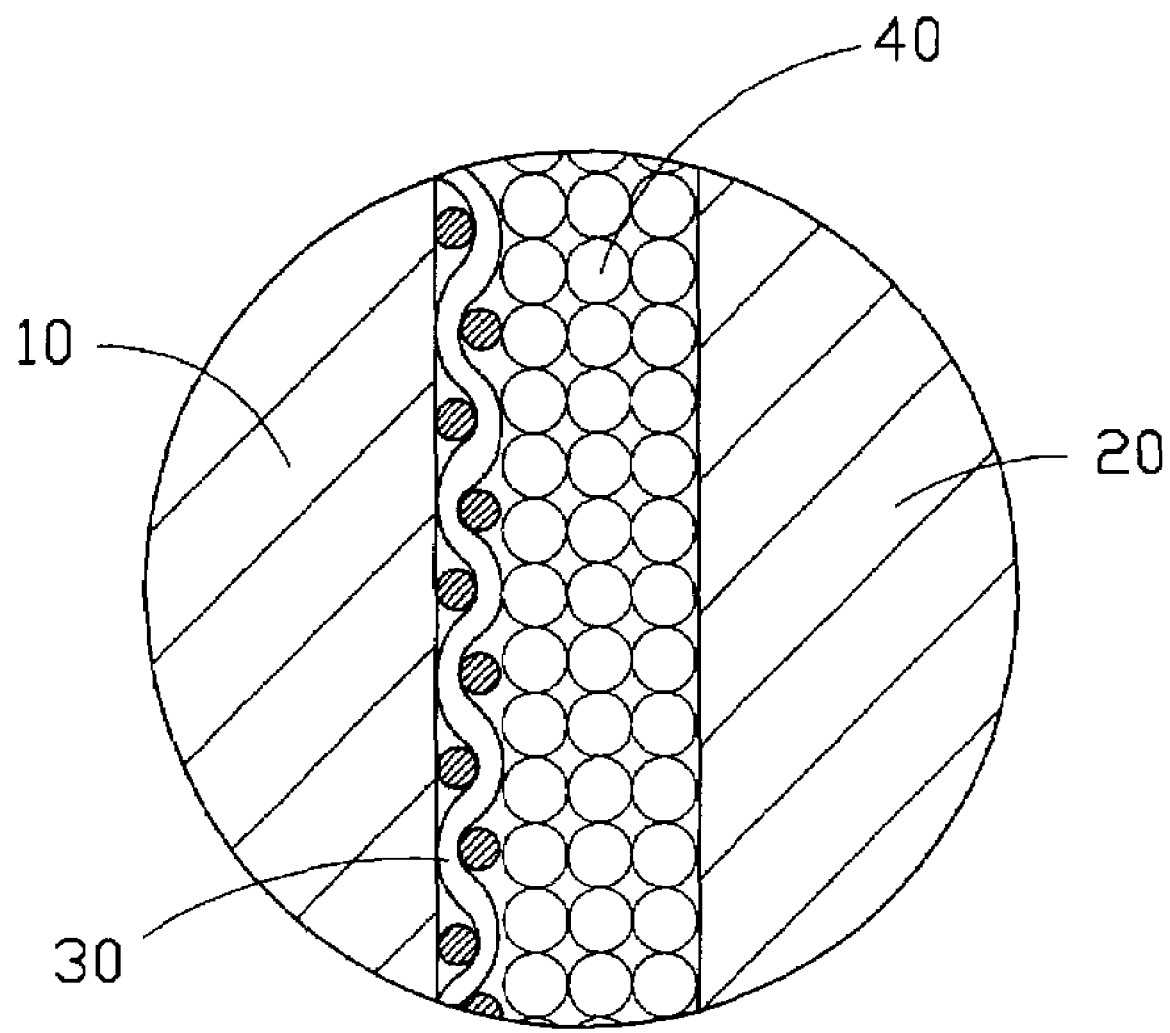
FIG. 4 is an enlarged view of a circled portion IV of FIG. 3.

After the mandrel 10 together with the mesh 30 is inserted into the hollow metal casing 20, powders 40 are successively filled into a space (not labeled) formed between the hollow metal casing 20 and the mesh 30 (step 103), as illustrated in FIGS. 3-4. A bottom end 21 of the hollow metal casing 20 has a tapered configuration in order to retain the filled powders 40 in the space formed between the hollow metal casing 20 and the mesh 30. Alternatively, the bottom end 21 may also be a closed end. The filled powders 40 may be a ceramic material or a metal material such as copper, aluminum, silver or nickel, or a combination thereof.

Figure 5:
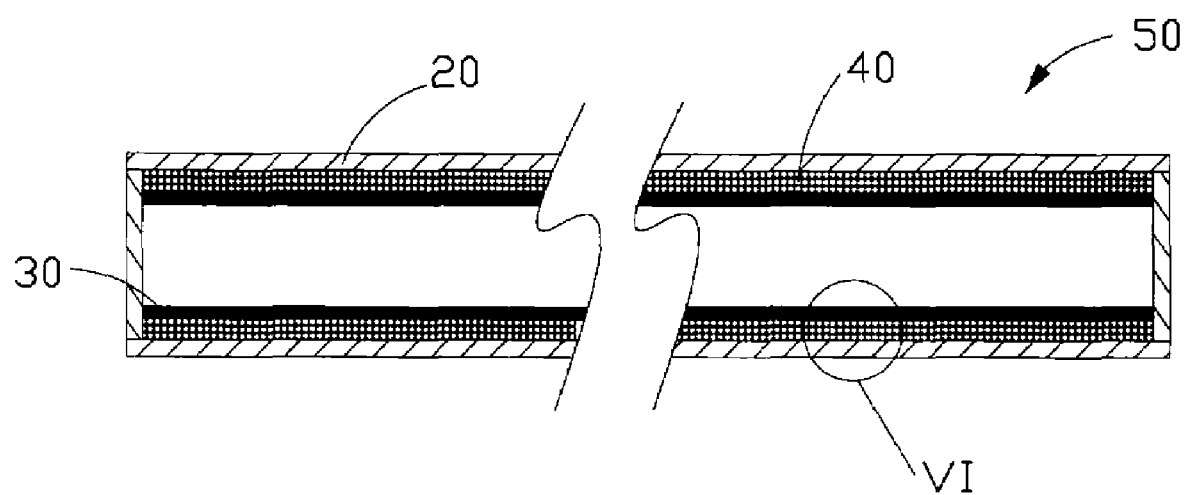
FIG. 5 is a longitudinal cross-sectional view of the heat pipe produced according to the method of FIG. 1.
Figure 6:
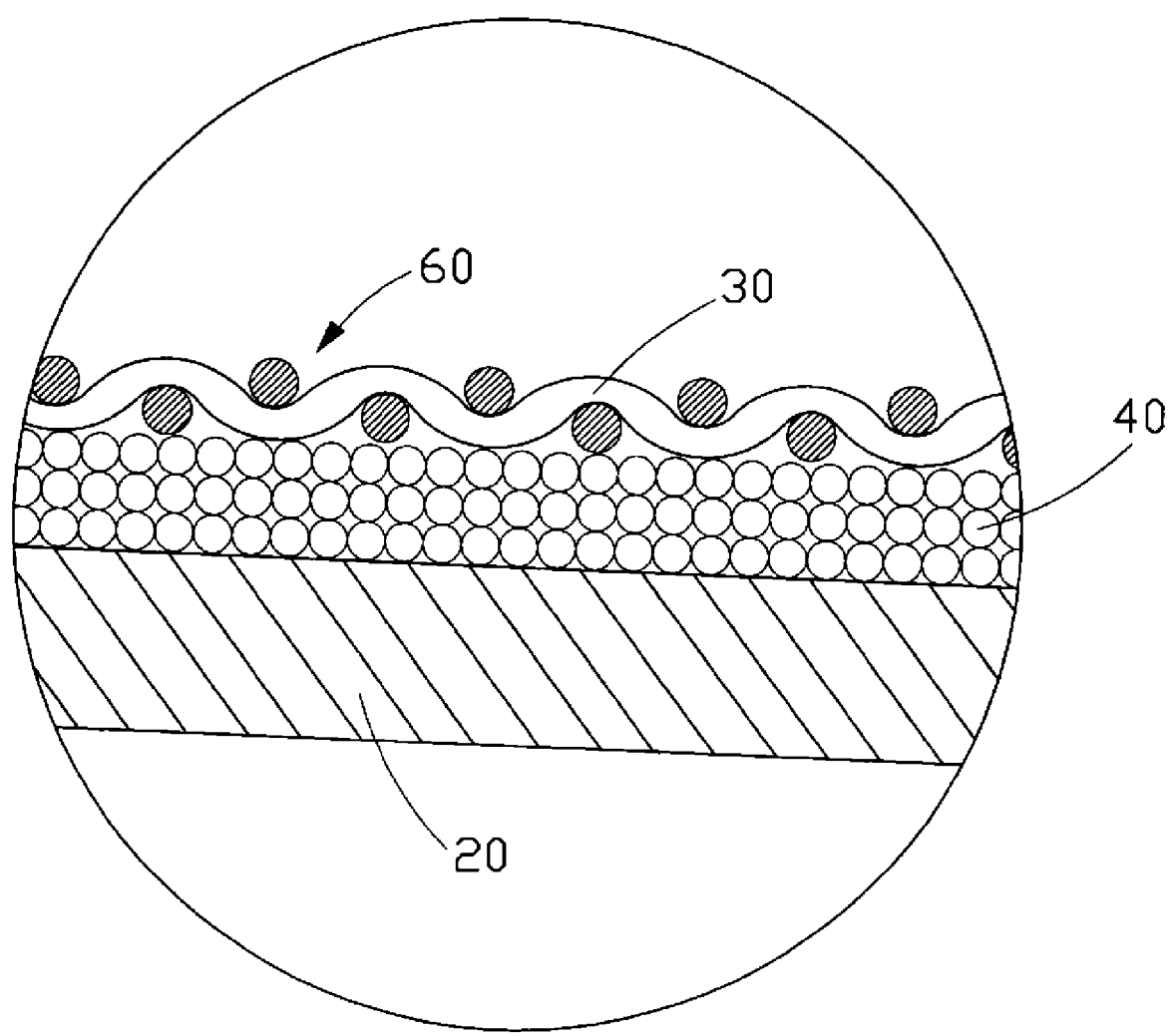
FIG. 6 is an enlarged view of a circled portion VI of FIG. 5.
Figure 7:
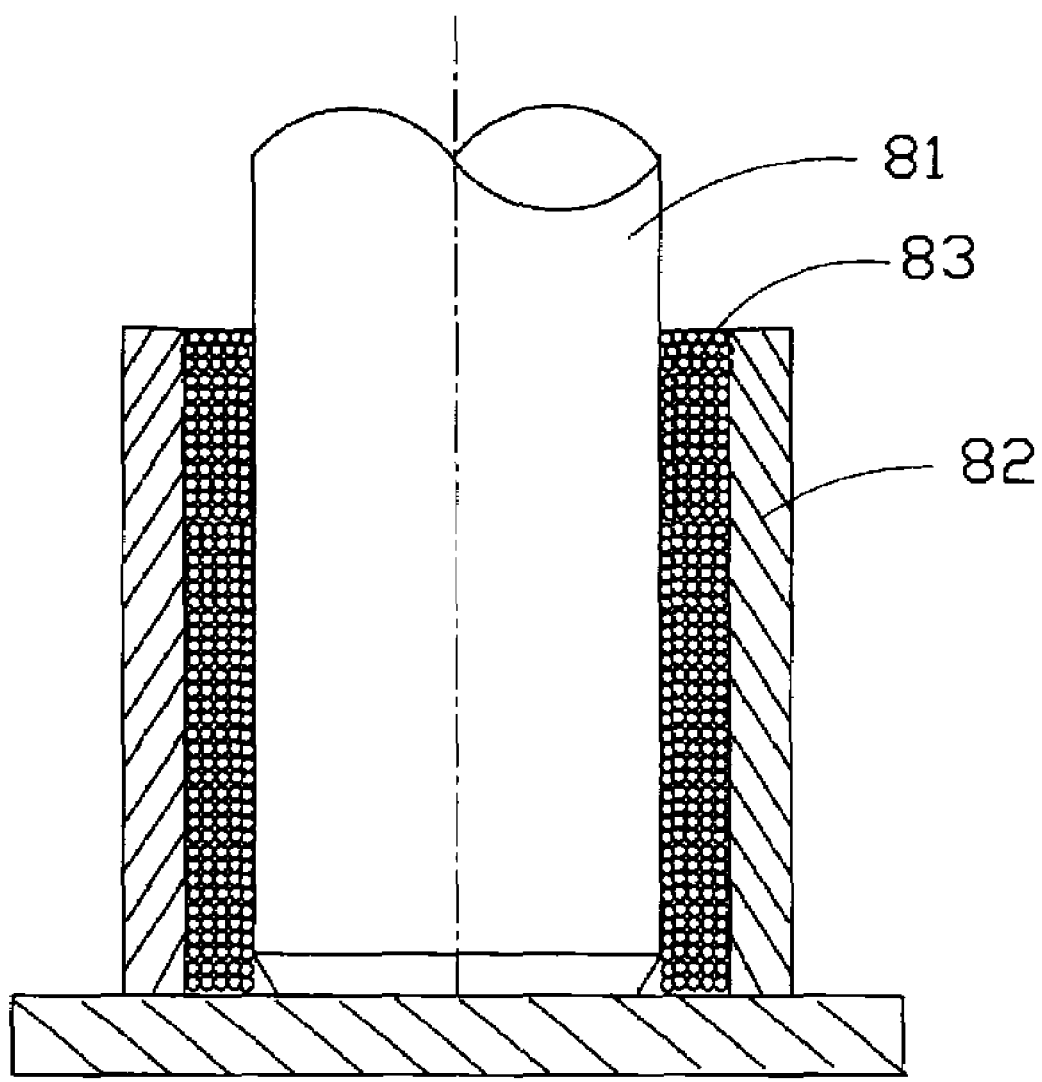
FIG. 7 illustrates the conventional sintering process for producing a heat pipe.

Then, the hollow metal casing 20 with the filled powders 40 therein is placed into an oven (not shown) and is heated under a high temperature, for example, about 500~1000 degrees Celsius if the filled powders 40 are copper, to cause the filled powders 40 to be sintered and diffusion bonded together (step 105). After this sintering process, the mandrel 10 is drawn out of the hollow metal casing 20 (step 107). After the mandrel 10 is removed, a working fluid such as water, alcohol, methanol, or the like, is injected into the hollow metal casing 20, and finally, two ends of the hollow metal casing 20 are hermetically sealed and air in the hollow metal casing 20 is pumped out so as to form a heat pipe 50 with a porous, composite wick structure 60 arranged therein (step 109), as illustrated in FIGS. 5-6.

In the present method 100, the filled powders 40 are separated from the mandrel 10 by the intermediate mesh 30. The filled powders 40 preferably have a powder size that is smaller than a diameter or width of the flexible wires used to form the mesh 30 so that the mesh 30 can be securely combined to the filled powders 40 in the sintering process 105 due to a diffusion bond at the contact interface between the mesh 30 and the filled powders 40. The mesh 30, as formed by weaving technology, has a rough surface and therefore has a small contact surface with the mandrel 10, as illustrated in FIG. 4. In the sintering process 105, the mesh 30, however, almost does not interact with the mandrel 10. Thus, the mandrel 10 can be removed out of the hollow metal casing 20 easily after the filled powders 40 are sintered.

In the present heat pipe 50 formed by the method 100, the composite wick structure 60 lines an inner wall surface of the hollow metal casing 20 and includes an outer powder layer comprised of the filled powders 40 and an inner mesh layer comprised of the mesh 30. The outer powder layer contacts the inner wall surface of the hollow metal casing 20. The inner mesh layer is stacked on an inner surface of the outer powder layer so that these two layers are arranged along a radial direction of the heat pipe 50. During operation, an evaporating section of the heat pipe 50 receives heat from a heat source (not shown) such as a central processing unit (CPU) and the working fluid contained therein evaporates into vapor. The vapor moves towards a condensing section of the heat pipe 50 through a central passage (not labeled) of the heat pipe 50. The vapor releases the heat carried thereby at the condensing section and turns into condensate. The condensate is then brought back to the evaporating section of the heat pipe 50 via the composite wick structure 60. In the present heat pipe 50, the filled powders 40 are selected from powders having small sizes. Therefore, the outer powder layer made of the filled powders 40 has a very dense structure and is capable of generating a large capillary force for drawing the condensate back from the condensing section towards the evaporating section of the heat pipe 50. On the other hand, the inner mesh layer, which is formed of the mesh 30, generally has a structure having a larger pore size than that of the adjacent inner powder layer. Thus, the condensate resulted from the vapor in the condensing section of the heat pipe 50 is capable of entering into the wick structure 60 easily due to a high liquid permeability of the inner mesh layer. The outer powder layer has a capillary force larger than that of the inner mesh layer, while the inner mesh layer has a liquid permeability higher than that of the outer powder layer. As a result, the condensate is drawn back from the condensing section to the evaporating section of the heat pipe 50 rapidly and timely.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of producing a heat pipe comprising the steps of:
   inserting a mandrel into a hollow metal casing with a porous structure combined to an outer surface of the mandrel;
   filling powders into a space formed between the hollow metal casing and the porous structure;
   sintering the filled powders;
   drawing the mandrel out of the hollow metal casing, leaving the porous structure combined with the sintered filled powders in the hollow metal casing; and
   sealing the hollow metal casing with a working fluid filled therein.

2. The method of claim 1, wherein the porous structure includes a mesh made by weaving a plurality of flexible wires together.

3. The method of claim 2, wherein the mesh has a rough surface to contact with the outer surface of the mandrel.

4. The method of claim 1, wherein the porous structure is formed of a metal sheet with a plurality of holes therein.

5. The method of claim 1, wherein the porous structure is combined to the mandrel before the mandrel is inserted into the hollow metal casing.

6. The method of claim 1, wherein the powders are made of a metal of one of copper, aluminum, silver and nickel.

7. The method of claim 1, wherein the powders are made of ceramic material.

8. A heat pipe made by a method comprising the steps of:
   inserting a mandrel into a hollow metal casing with a mesh attached on an outer surface of the mandrel;
   filling powders into a space formed between the hollow metal casing and the mesh;
   heating the hollow metal casing, powders, mesh and mandrel at a temperature that the powders are sintered and connected with the mesh;
   drawing the mandrel out of the hollow metal casing, leaving the mesh combined with the sintered filled powders in the hollow metal casing;
   injecting liquid in the hollow metal casing;
   pumping air out of the hollow metal casing; and
   sealing the hollow metal casing.

9. The heat pipe of claim 8, wherein the sintered powders have a capillary force larger than that of the mesh.

10. The heat pipe of claim 8, wherein the mesh has a liquid permeability higher than that of the sintered powders.

11. The heat pipe of claim 8, wherein the mesh is formed of a plurality of wires, and the powders each have a diameter which is smaller than a diameter of each of the plurality of wires forming the mesh.

\* \* \* \* \*